United States Patent [19]
Shichman

[11] Patent Number: 5,956,179
[45] Date of Patent: Sep. 21, 1999

[54] REPLICATED RELAY LENS SYSTEM

[75] Inventor: Daniel Shichman, Trumbull, Conn.

[73] Assignee: United States Surgical Corporation, Norwalk, Conn.

[21] Appl. No.: 08/939,731

[22] Filed: Oct. 6, 1997

Related U.S. Application Data

[63] Continuation of application No. 08/280,384, Jul. 26, 1994, abandoned.

[51] Int. Cl.$^6$ .................................................. G02B 27/02
[52] U.S. Cl. ........................ 359/434; 359/423; 359/728; 359/434; 385/117; 385/116; 385/119
[58] Field of Search .................................. 359/434, 423, 359/728, 435; 385/117, 116, 119

[56] References Cited

U.S. PATENT DOCUMENTS

| | | | |
|---|---|---|---|
| 2,339,433 | 1/1944 | Staehle | 264/1.7 |
| 2,388,893 | 11/1945 | Wood | 359/819 |
| 3,089,484 | 5/1963 | Hett | 600/139 |
| 3,257,902 | 6/1966 | Hopkins | 359/435 |
| 3,297,022 | 1/1967 | Wallace | 359/435 |
| 3,556,085 | 1/1971 | Takahashi | 600/129 |
| 3,830,460 | 8/1974 | Beattie | 249/134 |
| 3,917,766 | 11/1975 | Howden | 264/1.7 |
| 3,931,373 | 1/1976 | Beattie | 264/2.3 |
| 4,025,155 | 5/1977 | Imai | 359/435 |
| 4,036,218 | 7/1977 | Yamashita et al. | 359/435 |
| 4,148,550 | 4/1979 | MacAnally | 359/435 |
| 4,148,551 | 4/1979 | MacAnally | 359/435 |
| 4,168,882 | 9/1979 | Hopkins | 359/434 |
| 4,235,654 | 11/1980 | Dohi et al. | 156/99 |
| 4,267,828 | 5/1981 | Matsuo | 728/6 |
| 4,273,110 | 6/1981 | Groux | 128/6 |
| 4,300,812 | 11/1981 | Nakahashi | 359/432 |
| 4,354,730 | 10/1982 | Bel | 359/434 |
| 4,367,014 | 1/1983 | Howden | 425/808 |
| 4,385,810 | 5/1983 | Hamou | 128/4 |
| 4,484,798 | 11/1984 | Howden | 427/163 |
| 4,545,652 | 10/1985 | Hoogland | 359/434 |
| 4,575,195 | 3/1986 | Hoogland | 359/435 |
| 4,615,847 | 10/1986 | Howden | 264/1.7 |
| 4,657,354 | 4/1987 | Kobayashi | 264/1.7 |
| 4,664,486 | 5/1987 | Landre et al. | 359/380 |
| 4,668,558 | 5/1987 | Barber | 428/156 |
| 4,676,606 | 6/1987 | Takahashi | 359/754 |
| 4,693,568 | 9/1987 | Takahashi | 359/772 |

(List continued on next page.)

FOREIGN PATENT DOCUMENTS

| | | |
|---|---|---|
| 0260742 | 9/1987 | European Pat. Off. . |
| 0 487 138 A2 | 5/1992 | European Pat. Off. . |
| 3838168 | 10/1988 | Germany . |
| 57120901 | 1/1981 | Japan . |
| 9162-025-A | 9/1984 | Japan . |
| 2062-716-A | 3/1987 | Japan . |
| 3082-735-A | 4/1988 | Japan . |
| 544422 | 1/1977 | U.S.S.R. . |
| 683721 | 9/1979 | U.S.S.R. . |
| 686725 | 9/1979 | U.S.S.R. . |
| 2088 273 | 6/1982 | United Kingdom . |
| WO 93/15647 | 7/1993 | WIPO . |

OTHER PUBLICATIONS

"The Handbook of Plastic Optics", Second Edition, U.S. Precision Lens, Inc.
"Modern Optical Engineering", Warren J. Smith.
Philips Optics Publication on Optical Components, 1992.

*Primary Examiner*—Cassandra Spyrou
*Assistant Examiner*—Mohammad Y. Sikder

[57] ABSTRACT

A relay lens assembly and a method for manufacturing a relay lens system for an endoscope includes the steps of providing at least one rod member having first and second curved end surfaces, positioning a mold surface at a predetermined distance from one of the curved end surfaces of the rod member wherein the mold surface has a profile which is the negative of a required optical profile to be formed on the curved end surface, filling a space defined by the predetermined distance between the mold surface and the curved end surface with a moldable light transmissive material and solidifying the moldable material to form a molded layer adhered to the curved end surface.

37 Claims, 4 Drawing Sheets

U.S. PATENT DOCUMENTS

| | | | |
|---|---|---|---|
| 4,704,007 | 11/1987 | Landre et al. | 359/380 |
| 4,723,843 | 2/1988 | Zobel | 359/435 |
| 4,753,414 | 6/1988 | McCandless | 249/115 |
| 4,784,118 | 11/1988 | Fantone et al. | 600/160 |
| 4,826,553 | 5/1989 | Armitage et al. | 156/233 |
| 4,919,112 | 4/1990 | Siegmund | 600/136 |
| 4,946,267 | 8/1990 | Hoogland | 359/737 |
| 4,957,663 | 9/1990 | Zwiers et al. | 264/1.38 |
| 4,964,710 | 10/1990 | Leiner | 600/162 |
| 4,993,817 | 2/1991 | Hoogland | 359/737 |
| 5,005,960 | 4/1991 | Heimbeck | 359/435 |
| 5,020,893 | 6/1991 | Karst et al. | 359/435 |
| 5,049,321 | 9/1991 | Galic | 264/1.4 |
| 5,051,340 | 9/1991 | Tyan et al. | 430/321 |
| 5,067,800 | 11/1991 | Shirakawa | 359/642 |
| 5,116,548 | 5/1992 | Malik et al. | 264/1.34 |
| 5,142,410 | 8/1992 | Ono et al. | 359/435 |
| 5,188,092 | 2/1993 | White | 128/4 |
| 5,263,110 | 11/1993 | Anderson | 359/435 |
| 5,369,525 | 11/1994 | Bala et al. | 359/435 |
| 5,412,504 | 5/1995 | Leiner et al. | 359/434 |
| 5,416,634 | 5/1995 | Ning | 359/435 |
| 5,519,532 | 5/1996 | Broome | 359/435 |
| 5,539,971 | 7/1996 | Kelly | 29/418 |
| 5,554,100 | 9/1996 | Leiner et al. | 600/182 |

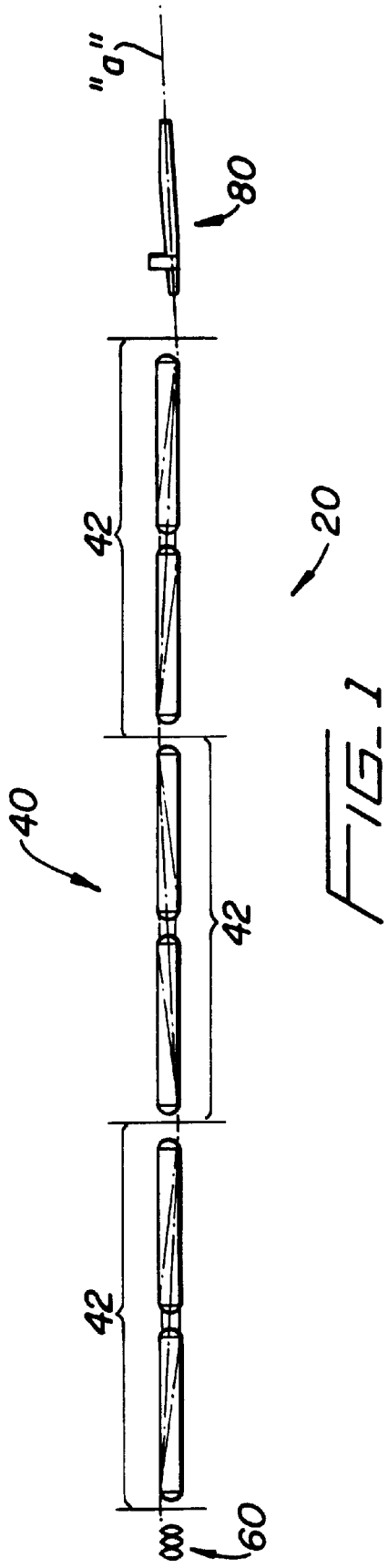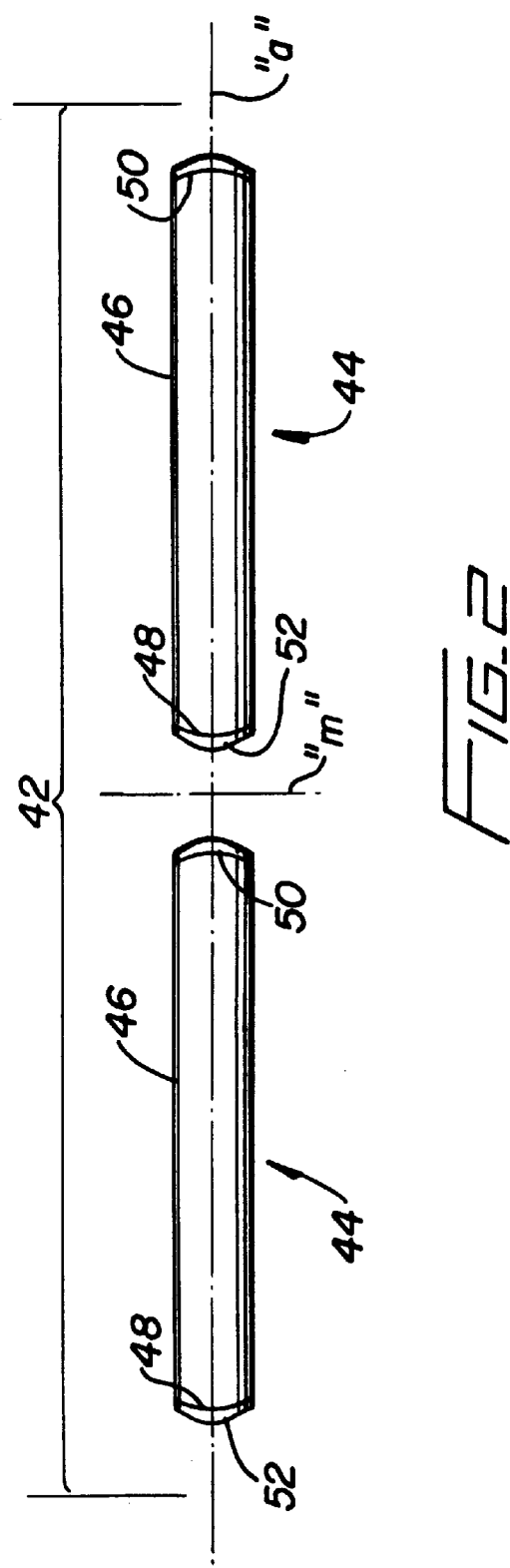

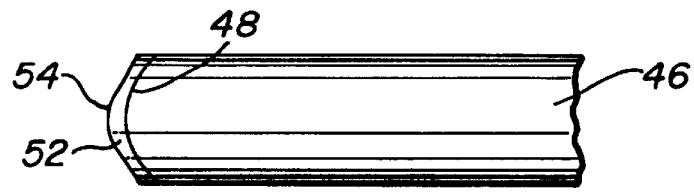
FIG_3
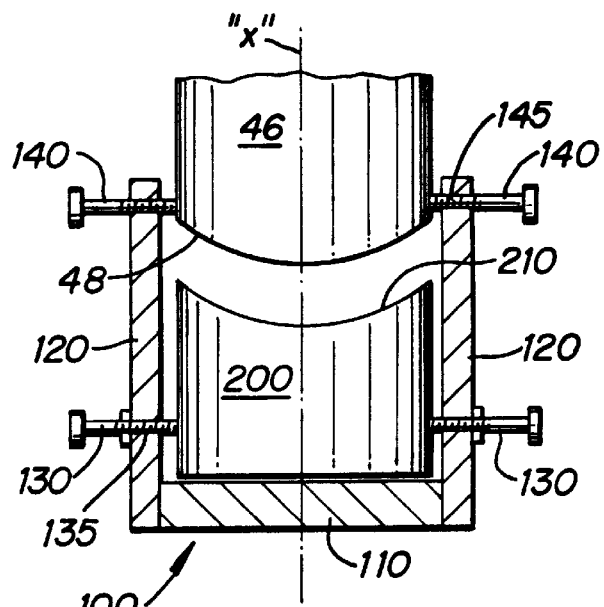
FIG_4
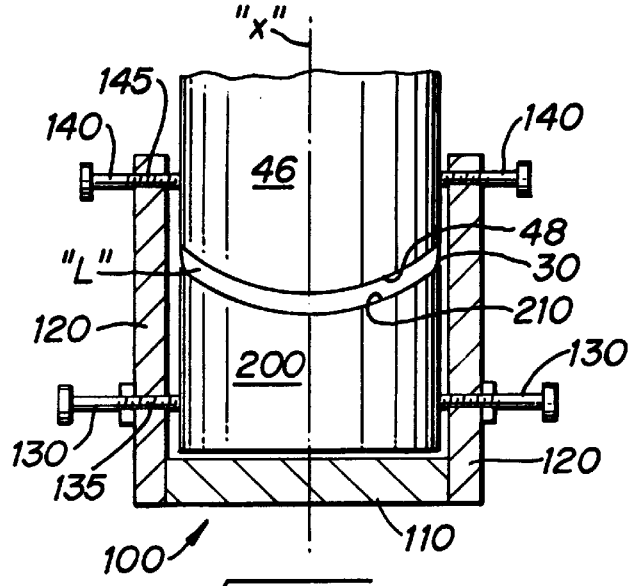
FIG_5

REPLICATED RELAY LENS SYSTEM

This is a continuation, of appln. Ser. No. 08/280,384 filed on Jul. 26, 1994 now abandoned.

BACKGROUND

1. Technical Field

The present disclosure relates generally to optical systems for endoscopic instrumentation and their manufacture, and, more particularly to a process for forming a relay lens system using replica molding techniques.

2. Description of Related Art

Endoscopes have long been used in surgery to view internal portions of a patient's body through a narrow incision in the body exterior or through a naturally occurring hollow viscus. Endoscopes are long, slender instruments having a shaft which is either rigid or flexible, depending upon the procedure being performed. In general, an endoscope includes an objective lens system to form an image of an object, a relay or image transmission system to transmit the image through the endoscope and an eye lens system to view the image transferred by the relay system. Examples of endoscopic optical systems are described in U.S. Pat. Nos. 3,089,484 to Hett, 3,257,902 to Hopkins, 3,556,085 to Takahachi, 4,036,218 to Yamashita, 4,267,828 to Matsuo, 4,273,110 to Groux, 4,575,195 to Hoogland, 4,545,652 to Hoogland, 4,946,267 to Hoogland, 4,964,710 to Leiner, 4,993,817 to Hoogland and 5,188,092 to White. Endoscopes are also equipped with an illumination system, such as a fiber optic bundle, which illuminates the area being imaged.

The relay lens systems of known endoscopic optical systems typically incorporate a series of field and relay lenses arranged to transfer an image through successive image planes within the system. The lens components of such conventional relay lens systems may be formed from glass, optical polymeric materials or combinations of glass lens components and polymeric components.

The decision to incorporate either glass components or polymeric components in a relay lens system for an endoscope depends upon the optical parameters to be achieved and the intended use of the endoscope, e.g., whether the scope is intended to be disposable, i.e., disposed after a single use, or wholly or partly reusable and sterilized after each use. In general, glass lens components provide enhanced optical effectiveness, but, are expensive to manufacture, requiring extensive precision grinding and polishing of the lens surfaces. Consequently, the use of glass lens components in disposable endoscopes is preferably minimized to reduce cost. Polymeric lenses, on the other hand, may be manufactured by cost-effective injection molding techniques. Accordingly, the incorporation of polymeric lenses in a disposable endoscope is preferably optimized to minimize cost while still providing acceptable optical effectiveness.

Several conventional endoscopic relays lens systems also incorporate rods or cylinders to enhance transfer of the light through the optical train. For example, U.S. Pat. No. 4,946, 267 to Hoogland teaches an endoscopic relay optic design including an assembly having a central rod-like transfer element with first and second negative and positive optical elements attached to each end of the rod like element. The optical elements are directly cemented to each other and to the rod-like element to form a single unit which is subsequently positioned within the lens tube of the endoscope during assembly.

The disadvantages regarding the manufacture of conventional systems are apparent. First, glass positive and negative elements must be individually formed by expensive optical grinding and polishing techniques, thus, adding further cost to an already expensive instrument. Second, assembly of the system requires cementing of the glass and/or polymeric optical elements to each other and then optionally to rod-like elements, thereby requiring additional steps during manufacture. In addition, where a rod-like element having flat end surfaces is used the end surfaces must be ground and polished to a precise finish so as to minimize undesired light scattering or absorption by these surfaces.

In accordance with conventional replica molding processes, a master mold having a surface which is the negative replica of a desired lens surface to be provided is positioned adjacent a substrate. Thereafter, a few drops of low-shrinkage epoxy are pressed out into a thin layer between the master and the substrate. The epoxy is cured and the master is removed leaving a precise negative replica on the substrate. Replica molding processes are commonly used to form opthamalic lenses, mirrors, correction plates, fresnel lenses, video discs and diffraction gratings. See for example, U.S. Pat. Nos. 4,957,663, 4,615,847, 4,484,798, 4,367,014 and 3,917,766.

SUMMARY

An entirely unique approach to the manufacture of relay lens systems for disposable endoscopes is contemplated herein. By incorporating replica molding techniques, a more efficient relay lens system can be manufactured while still providing satisfactory optical performance. In addition, as will be appreciated from the description provided hereinbelow, the inherent disadvantages of known relay lens manufacture are obviated.

Generally stated an endoscope and method for manufacturing a relay lens system for an endoscope are provided wherein the system has at least one relay lens module for transferring an image between successive image planes. The method comprises the steps of providing at least one rod member having first and second curved end surfaces and defining a longitudinal axis, positioning a mold surface adjacent the curved end surface of the rod member wherein the mold surface has a profile which is the negative of a required optical profile to be formed on the curved end surface, filling the space between the mold surface and the curved end surface with a light transmissive moldable material, substantially solidifying the moldable material to form a molded layer adhered to the first curved end surface and releasing the mold surface from the molded layer and the rod member to form a relay lens assembly wherein two such assemblies arranged in a bilateral symmetrical end to end manner form a relay lens module.

In accordance with a preferred method, the molded layer forms a lens component having an aspherical outer lens surface. Preferably, the method is repeated to form an identical lens component on the second curved end surface of the rod member thereby forming a lens assembly with a central rod member and two identical lens components adhered to each end surface of the rod member. Thus, with the replica molding developments disclosed herein, a relay lens system incorporating rods and lens components attached to each end surface of the rods can be economically manufactured and still provide satisfactory optical performance. The lens components formed by the replica molding developments are relatively thin lenses as compared to the ground and polished glass relay and field lenses and molded polymeric lenses incorporated in conventional relay lens systems. Thus, resolving power of the optical system is enhanced and transmission of light through the optical train is increased. Further, the overall weight of the optical system is minimized. In addition, the lens surfaces of the rod members do not require extensive finishing, thereby, eliminating an expensive manufacturing step required with known relay lens systems.

Thus, a relay lens system is provided having significant advantages over prior art systems. In particular, as will be appreciated from the description provided herein, the formation of the lens element as well as the mounting of the optical lens element to an adjacent optical component may be achieved in a single step. Furthermore, the replica molding technique is capable of economically forming aspheric surfaces, often desired by optical designers to obtain superior performance, e.g., control of aberrations and astigmatism. This control is typically not available with spherical surfaces. In addition, the same replica mold can be repeatedly used to economically form a large quantity of relay lens components. In particular, because the curved lens surface is formed by replica molding, the exact curvature and polish of the curved ends of the rod members are not critical. Accordingly, cost may also be reduced as the number of component lenses to be assembled is reduced.

BRIEF DESCRIPTION OF THE DRAWINGS

Various embodiments are described herein with reference to the drawings wherein:

FIG. 1 is an optical schematic view of an endoscopic optical system illustrating ray path and image orientation;

FIG. 2 is an optical schematic view of a single transfer module of the relay lens system of FIG. 1;

FIG. 3 is an enlarged optical schematic view illustrating the replicated lens formed on the rod lens substrate of the module of FIG. 2; and FIG. 4 is a cross-sectional view illustrating a preferred method for forming the replicated lens on the rod lens substrate with the substrate positioned within the jig;

FIG. 5 is a cross-sectional view similar to the view of FIG. 4 illustrating the position of the rod lens substrate adjacent the mold during the replica molding process;

DETAILED DESCRIPTION OF PREFERRED EMBODIMENTS

Figure 6:
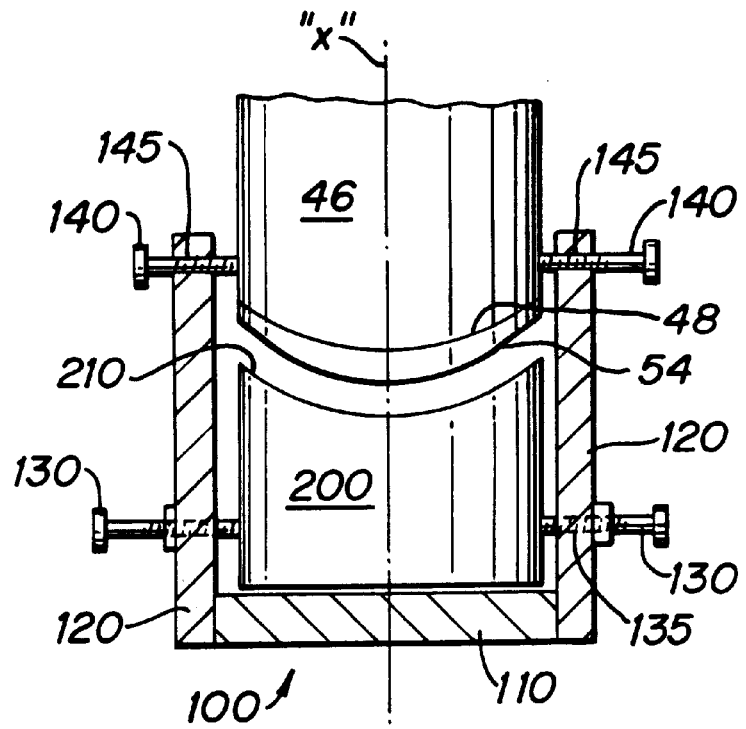
FIG. 6 is a cross-sectional view similar to the view of FIG. 5 illustrating the rod lens substrate removed from the mold with the replicated lens formed thereon.

Referring now to the drawings, and, in particular, to FIG. 1, there is shown a schematic of an endoscopic optical system 20 incorporating a relay lens system 40. Relay lens system 40 has particular application in disposable endoscopes and can be used in combination with a conventional objective lens assembly 60 and a conventional eye lens assembly 80 as shown.

Relay lens system 40 includes a plurality of relay lens modules 42 arranged in end to end fashion along optical axis "a". Each module 42 is identical with regard to the optical elements contained therein, and is capable of transferring an image from an image plane at the entrance side of a single module to a successive image plane formed on the exit side of the module.

Referring now to FIG. 2, the relay lens module 42 includes two identical optical assemblies 44 arranged in a bilateral symmetrical end to end manner about a median plane "m" equidistant between the two assemblies. Each assembly 44 includes a rod member 46 having first and second curved surfaces 48, 50 and a curved lens component 52 formed on, and connected to, each lens surface 48, 50. Rod 46 preferably is formed from an optical glass material, e.g. K10, SF5, etc. In the alternative, rod 46 may be formed of optical plastic material such as styrene, acrylic, polycarbonate and polystyrene. Surfaces 48, 50 do not have to be ground and polished to a precise finish and lens surface as in conventional systems. Curved surfaces 48, 50 preferably roughly approximate the desired lens surface curvature but do not have to be precisely formed as the final lens surface is provided by the polymeric replica component.

Referring to FIG. 3, lens 52 has outer lens surface 54 which preferably is aspherical. As aforementioned, aspherical surfaces are often desired to provide enhanced performance not available with spherical surfaces and to control aberrations, astigmatism, etc. Lens component 52 is preferably formed by replica molding techniques.

Referring now to FIGS. 4–6, the method for forming the replica lens component 52 on surfaces 48, 50 of rod lens 46 is illustrated in detail. A jig 100 supports mold 200 having mold surface 210. Mold surface 210 has a profile which is an accurate negative of the required surface 54 of the lens component 52 to be produced. Mold surface 210 of mold 200 is generally concave and aspheric, thus producing aspheric convex lens surface 54 of lens component 52.

The mold surface 210 of mold 200 is preferably formed of a material which can be ground and polished into precise surfaces to form the desired profile accuracy and to form the desired optical finish, and which possesses a relatively low adhesion factor to various types of polymeric materials and resins to thereby facilitate separation of the replicated lens from the mold 200 as will be appreciated from the description provided below. A preferred mold material is quartz.

Jig 100 includes horizontal plate 110 which supports mold 200 and two vertical plates 120. A first set of opposed screws 130 extend through threaded bores 135 in the lower portions of vertical plates 120. Screws 130 enable the user to adjust the horizontal positioning of mold 100. A second set of screws 140 extend through threaded bores 145 defined in the upper portions of vertical plates 120. Screws 140 permit the user to fix the axial positioning of the substrate, i.e., rod lens 46, during the replica process.

FIG. 4 illustrates one end portion of rod 46 positioned within jig 100 above mold 200. Rod 46 is supported by set screws 140 which are rotated to engage the rod. The axial position of rod 46 is adjustable axially relative to mold 200 via set screws 140. The position of rod 46 is adjusted to set the appropriate distance between the curved end surface 48 of rod 46 and mold surface 210 of mold 200, measured along the aligned axis "x" of these surfaces, so as to provide the desired thickness of the finished lens component 52. FIG. 5 illustrates the desired positioning of rod lens 46 during the replica process.

The gap 30, defined between curved end surface 48 and mold surface 210, is then filled with a suitable lighttransmissive moldable material (e.g., polymeric material, moldable glass, etc.) in liquid form. The liquid material "L" spreads between the surfaces to form a liquid layer as shown in FIG. 5. Thereafter, the layer "L" is solidified to form the desired lens component 52. In the preferred process, the liquid material is an ultraviolet light curable polymeric resin.

Figure 7:
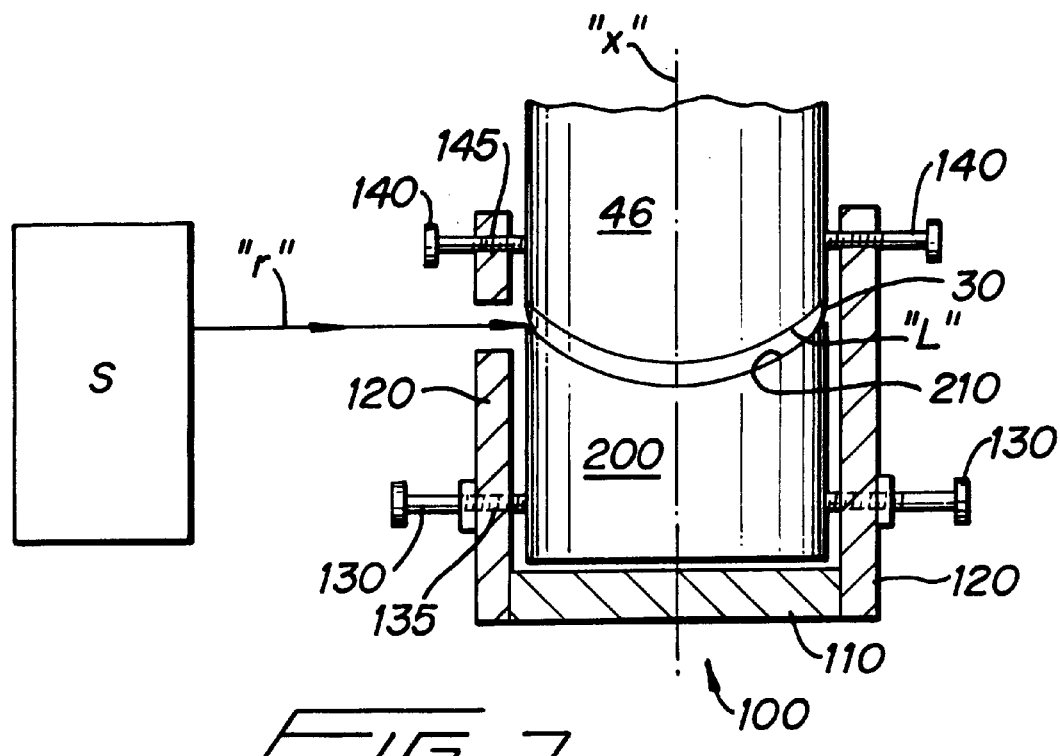
FIG. 7 is a cross-sectional view similar to the view of FIG. 5 illustrating the use of an ultraviolet light source to cure the moldable material during the replica process.

When resin is used, the liquid layer may be exposed to a ultraviolet light rays "m" emitted by ultraviolet light source S as shown in FIG. 7 to cure the resin material and form lens component 52.

Referring to FIG. 6, the process is continued by separating rod 46 and adhered molded layer lens component 52 from mold 200. As previously noted, the low adhesion factor of the material of mold surface 210 facilitates release of lens component 52 from mold surface 210. It is also envisioned that mold surface 210 may be treated with a release agent prior to depositing the liquid material to facilitate separation of molded layer 52 from mold surface 210. Release agents suitable for this purpose include silver, salt, silicone or plastic.

The formed layer or lens component 52 is bonded on one side to outer surface 48 of rod lens 46, and on the other side defines an aspherical surface 54 of the desired profile and optical finish as reproduced from mold surface 210 of the mold 200. Thereafter, the other end of the rod 46 having curved surface 50 is mounted within jig 100 and the above process is repeated to form an identical lens component 52 on curved end surface 50 in a similar manner. It is contemplated that different lens surface configurations may be obtained by using different shaped molds.

It is also envisioned that lens component 52 may be formed in several molded layer steps. For example, after separation of rod 46 and molded layer 52 from mold surface 210, the above process can be repeated several times to form a molded lens component of a desired thickness or shape.

In the above example, the process is used to produce a lens having a convex aspherical surface. The method may also be employed to produce a lens having a concave aspherical surface. Further, rod 46 may have end surfaces which are plano rather than convex, as shown. It is also to be noted that the liquid material may be placed in molded lens surface 210 prior to positioning rod 46 at the desired location and, thereafter, the rod 46 may be advanced to its appropriate position to sandwich the resin material between curved end surface 48 and mold surface 210. It is further envisioned that a lens component 52 can be simultaneously produced on each surface 48, 50 with the use of a second jig 100 and second mold 200.

In accordance with this method, a relay lens system can be made relatively inexpensively while still providing satisfactory optical performance. The replica lens mold utilized to produce the desired lens element 52 on the rod substrate may be repeatedly used to produce a large quantity of precise lens components. Assembly of the system is also enhanced since the lens element is directly mounted to the rod lens substrate during the replica process, thereby reducing the number of components to be assembled during final endoscope assembly.

Figure 8:
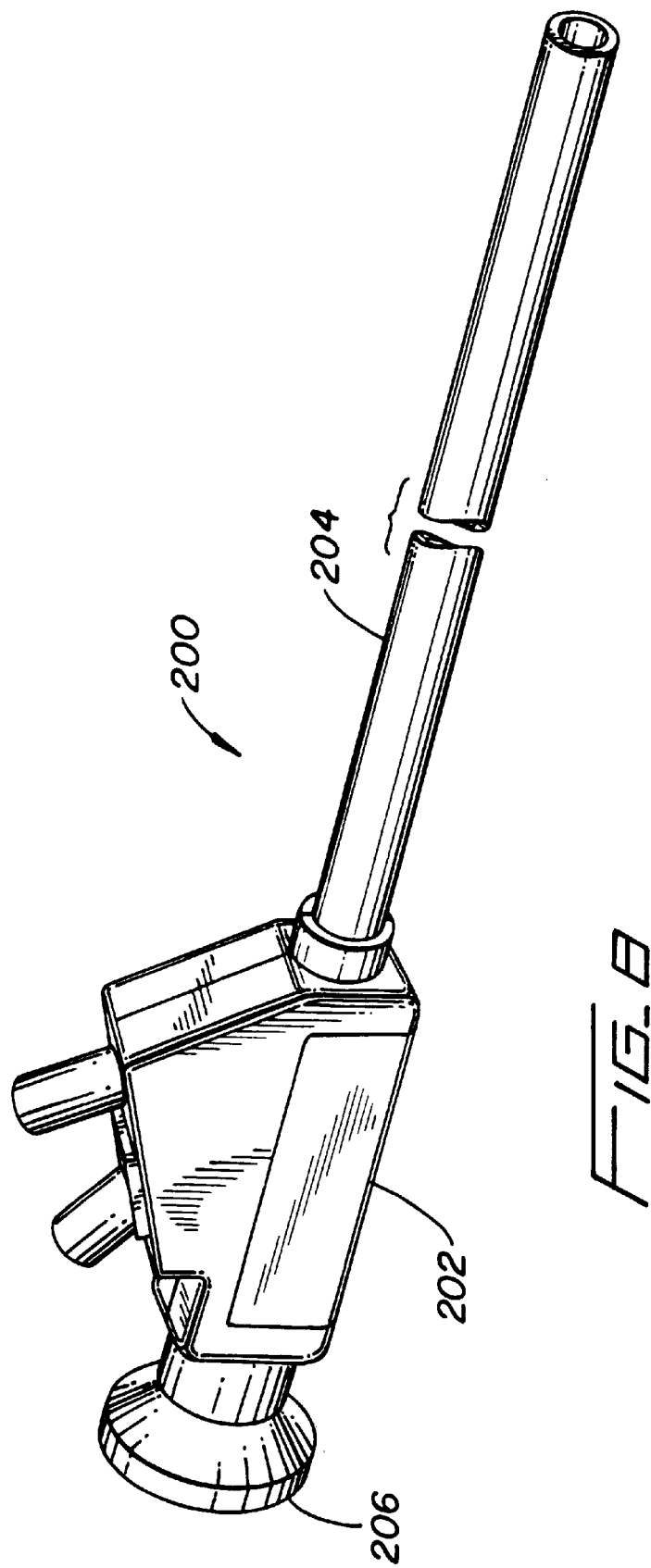
FIG. 8 is a perspective view of an endoscope incorporating the relay lens system of FIG. 1.

FIG. 8 illustrates a perspective view of an endoscope incorporating the relay lens system produced using the replica molding developments set forth herein. Endoscope 200 includes a frame 202 and an endoscopic portion 204 extending distally from the frame 202. The endoscopic portion 204 houses the optical components of the objective 60 and relay lens system 40 of FIG. 1. An eye piece 206 is attached to the proximal end of the frame 202 and contains therein eye lens assembly 80. Endoscope 200 also includes an illumination system (not shown) for providing illuminating light.

While the above description contains many specifics, these specifics should not be construed as limitations on the scope of the invention, but merely as an exemplification of a preferred embodiment thereof. Those skilled in the art will envision other possible variations that are within the scope and spirit of the invention as defined by the claims appended hereto.

What is claimed is:

1. A relay lens system for an endoscope comprising at least one rod member having first and second end surfaces and a separate molded lens component formed on, and connected to, each said end surface of said rod member, wherein said at least one rod member with said molded lens components formed on said first and second end surfaces define a relay lens assembly.

2. The relay lens system of claim 1 comprising a plurality of said relay lens assemblies in longitudinal axial alignment.

3. The relay lens system of claim 1 wherein said first and second end surfaces are substantially convex surfaces.

4. The relay lens system of claim 1 wherein said molded lens component has a generally convex outer surface.

5. The relay lens system of claim 4 wherein said convex outer surface of each said molded lens component is aspheric.

6. The relay lens system of claim 1 wherein said at least one rod member comprises a polymeric material.

7. The relay lens system of claim 1 wherein said at least one rod member comprises a glass material.

8. The relay lens system of claim 1 wherein said at least one rod member comprises a first optical material and said molded lens component comprises a second optical material different from said first optical material.

9. The relay lens system of claim 8 wherein said second optical material includes a light transmissive polymeric material.

10. The relay lens system of claim 9 wherein said second optical material includes a light transmissive resin material.

11. A method for forming a relay lens system for an endoscope comprising the steps of:
    providing at least one rod member having first and second end surfaces; and
    forming a separate lens component directly on each said end surface of said rod member, wherein said rod member and said lens components define a relay lens assembly.

12. The method of claim 11 wherein the step of forming includes molding said separate lens component on at least one end surface of said rod member.

13. The method of claim 12 wherein the step of forming includes molding said separate lens component on each said end surface of Said rod member.

14. The method of claim 12 wherein said one rod member comprises a first optical material and wherein the step of forming includes molding said separate lens component comprising a second optical material different from said first optical material.

15. The method of claim 14 wherein the step of forming includes molding said separate lens component on each said end surface of said rod member.

16. The method of claim 14 wherein the step of forming includes molding said separate lens component comprising a polymeric material.

17. The method of claim 11 wherein said first and second end surfaces of said one rod member are convex surfaces and wherein the step of forming includes molding said separate lens component on at least one end surface of said rod member.

18. The method of claim 17 wherein the step of forming includes molding said separate lens component on each said end surface of said rod member.

19. The method of claim 17 wherein the step of forming includes molding said separate lens component having a generally convex outer surface.

20. The method of claim 19 wherein the step of forming includes molding said separate lens component on each said end surface of said rod member.

21. The method of claim 17 wherein said one rod member comprises a first optical material and wherein the step of forming includes molding said separate lens component comprising a second optical material different from said first optical material.

22. The method of claim 21 wherein the step of forming includes molding said separate lens component on each said end surface of said rod member.

23. The method of claim 22 wherein the step of forming includes molding said separate lens component having a generally convex outer surface.

24. An endoscope comprising:
   a frame;
   an endoscopic portion extending distally from the frame; and
   an optical system including:
      an objective lens assembly;
      a relay lens assembly including a rod member having first and second end surfaces, and an individual molded lens component formed on, and connected to, each end surface of the rod member; and
      an eye lens assembly.

25. The endoscope of claim 24 wherein said first and second end surfaces are curved.

26. The endoscope of claim 25 wherein said first and second surfaces are convex surfaces.

27. The endoscope of claim 26 wherein each said molded lens component has a generally convex outer surface.

28. The endoscope of claim 27 wherein said convex outer surface of each said molded lens component is aspheric.

29. The endoscope of claim 24 wherein said at least one rod member comprises a polymeric material.

30. The endoscope of claim 24 wherein said at least one rod member comprises a glass material.

31. The endoscope of claim 24 wherein said rod member comprises a first optical material and said molded lens component comprises a second optical material different from said first optical material.

32. A relay lens assembly for an endoscope comprising at least one rod lens member having first and second curved end surfaces and a separate molded lens formed on, and connected to, each end surface of the rod lens member, the rod lens member comprising an optical glass and at least one of the molded lenses comprising a polymeric material.

33. The relay lens assembly of claim 32 wherein each molded lens comprises a polymeric material.

34. The relay lens assembly of claim 32 wherein the rod lens member is a positive lens.

35. The relay lens assembly of claim 32 wherein each molded lens is a single lens.

36. The relay lens assembly of claim 35 wherein the rod lens member is a positive lens.

37. A relay lens assembly for an endoscope comprising at least one positive rod lens member having first and second end surfaces and a single lens formed on, and connected to, each end surface of the rods lens member.

* * * * *